US005408079A

United States Patent [19]

Kobayashi et al.

[11] Patent Number: 5,408,079

[45] Date of Patent: Apr. 18, 1995

[54] ARTICLE WITH INFORMATION FOR RETRIEVAL AND ARTICLE RETRIEVAL SYSTEM

[75] Inventors: Kazuo Kobayashi, Kakamigahara; Takemi Yamamoto, Nagoya, both of Japan

[73] Assignee: Brother Kogyo Kabushiki Kaisha, Aichi, Japan

[21] Appl. No.: 76,358

[22] Filed: Jun. 14, 1993

[30] Foreign Application Priority Data

Jun. 15, 1992 [JP] Japan .......... 4-155226
Sep. 9, 1992 [JP] Japan .......... 4-268050

[51] Int. Cl.⁶ .......... G06K 15/00

[52] U.S. Cl. .......... 235/383; 194/209; 194/212; 241/24

[58] Field of Search .......... 235/383, 385, 375, 376, 235/419, 435; 194/211, 209, 212; 241/24

[56] References Cited

U.S. PATENT DOCUMENTS

| | | | |
|---|---|---|---|
| 4,579,216 | 4/1986 | DeWoolfson et al. | 194/212 |
| 5,028,766 | 7/1991 | Shah | 235/383 X |
| 5,042,634 | 8/1991 | Gulmini | 194/209 |
| 5,257,741 | 11/1993 | Rode et al. | 241/24 |

*Primary Examiner*—Donald Hajec
*Assistant Examiner*—Michael G. Lee
*Attorney, Agent, or Firm*—Kane, Dalsimer, Sullivan, Kurucz, Levy, Eisele and Richard

[57] ABSTRACT

An article which bears information representative of a convertible value thereof is deposited by a consumer for retrieval by the manufacturer of the article. The information is represented by a bar code on the article and read by a bar-code reader. A valuable return, such as a monetary payment, to the consumer is prepared based on the convertible value represented by the information read by the bar code reader. The valuable return is actually made to the consumer based on information borne by a consumer's recording card and updated based on the information read by the bar-code reader.

2 Claims, 6 Drawing Sheets

ARTICLE WITH INFORMATION FOR RETRIEVAL AND ARTICLE RETRIEVAL SYSTEM

BACKGROUND OF THE INVENTION

The present invention relates to an article which bears information representing a convertible value of the article or information for retrieval of the article, and an article retrieval system for collecting a deposited article, such as a disused article, in exchange for a monetary return based on the information on the article which represents a convertible value of the article.

Articles of merchandise that have been either disused or no longer necessary are mostly thrown away as trash. However, recent growing concern over environmental issues has focused on efforts to collect harmful substances that are contained in discarded articles and recycle reusable materials that are also contained in discarded articles. In view of the need for retrieval of some disused articles, attempts have been made for consumers to return disused articles that should be collected to their manufacturers by paying the carriage or to have retailers and dealers collect disused articles with payments. As the manufacturers' liability problems draw more and more attention, some manufacturers have begun to reduce the amount and number of toxic substances contained in manufactured articles and to collect disused articles for free.

The collection of disused articles in the past has been unsatisfactory because no sufficient data is available with regard to collected articles and consumers are not cooperative and the rate of collection of articles is low in the absence of definite merits on the part of consumers.

The article retrieval systems that have heretofore been established by manufacturers involve a large expenditure of time, labor, and money, and are not popular enough for a substantial number of consumers to deposit disused articles for retrieval without throwing them away.

SUMMARY OF THE INVENTION

It is therefore an object of the present invention to provide an article retrieval system which is capable of producing sufficient data about articles that have been collected and of giving definite benefits to consumers who cooperate in collecting articles.

Another object of the present invention is to provide an article which bears either information useful for retrieval and/or information representing a convertible value of the article.

For the above objects, according to an aspect of the present invention, there is provided an article bearing information representative of a convertible value which is determined by the necessity of collecting the article.

According to another aspect of the present invention, there is also provided an article including a package bearing information thereon representative of a system for collecting the article, information that an expense of collecting the article through the system is paid by a receiver of collected the article, and information representative of a place to deposit the article in the system.

According to still another aspect of the present invention, there is also provided an article retrieval system for collecting an article deposited by a depositor, the article bearing information representative of a convertible value thereof, said article retrieval system comprising reader means for reading the information borne by the article, and control, means for preparing a valuable return to the depositor based on the convertible value represented by the information read by said reader means.

DESCRIPTION OF THE ACCOMPANYING DRAWINGS

DESCRIPTION OF THE EMBODIMENTS

Figure 1:
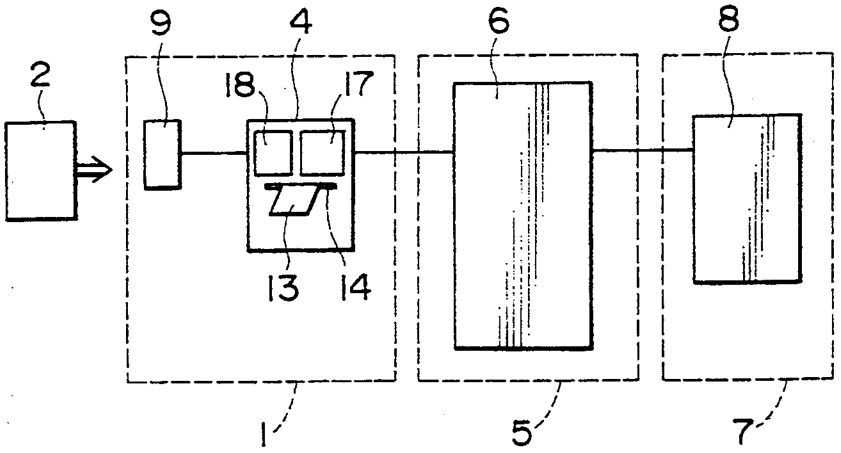
FIG. 1 is a block diagram of an article retrieval system according to the present invention.

As shown in FIG. 1, an article retrieval system according to the present invention generally comprises an article collecting station 1 for collecting an article 2 of merchandise such as a disused article deposited by a consumer, a system control station 5, and a manufacturer's station 7. The article collecting station 1 has a collection terminal device 4 including a card reader 17 and a card recorder 18, and a bar-code reader 9 connected to the collection terminal device 4. The system control station 5 has a host computer 6 connected to the collection terminal device 4. The host computer 6 serves to control or process data transferred to and from the collection terminal device 4. The manufacturer's station 7 has a control terminal device 8 connected to the host computer 6 for controlling or processing the rate of collection of articles and other information based on data transferred from the host computer 6.

Figure 2:
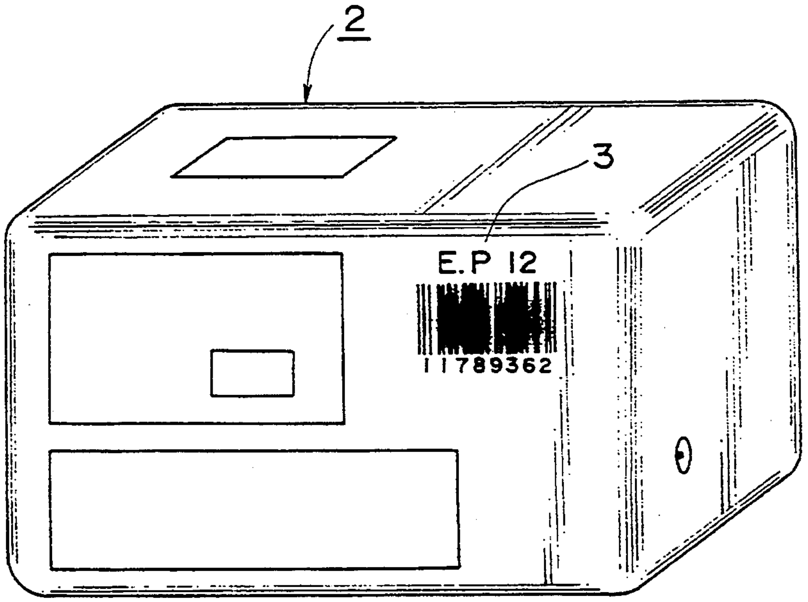
FIG. 2 is a perspective view of an article according to the present invention.

As shown in FIG. 2, the article 2 has a printed bar code 3 on a surface thereof which represents various pieces of information including a point (hereinafter referred to as an "ecology point") determined by the necessity of collecting the article 2, i.e., how important it is to collect the article 2, and representing a convertible value of the article 2. The pieces of information represented by the bar code 3 also include the name of the article 2, and the name of the manufacturer of the article 2.

The bar code 3 on the article 2 is read by the bar-code reader 9 of the article collecting station 1. The collection terminal device 4 also has a card slot 14 for the insertion therethrough of a consumer's recording card 13 with various items of information recorded thereon. When the bar code 3 on the article 2 is read by the bar code reader 9, the information represented by the bar-code 3 is transferred from the collection terminal device 4 to the host computer 6. When the consumer's recording card 13 is inserted into the card slot 14, the recorded information on the consumer's recording card 13 is read by the card reader 17. At the same timer in return for the deposited article 2, any ecology point recorded on the consumer's recording card 13 is rewritten by the card recorder 18, and the rewritten ecology point is transferred to the host computer 6. The host computer 6 classifies and records the supplied data for the manufacturer of the article 2, transfers the data to the control terminal device 8, and makes a remittance to the collection terminal device 4 for a monetary payment based on the ecology point earned at this time. Based on the data transferred from the host computer 6, the control terminal device 8 processes or updates the rate of collection of articles, and makes a remittance to the system Control station 5 for the monetary payment.

Figure 3:
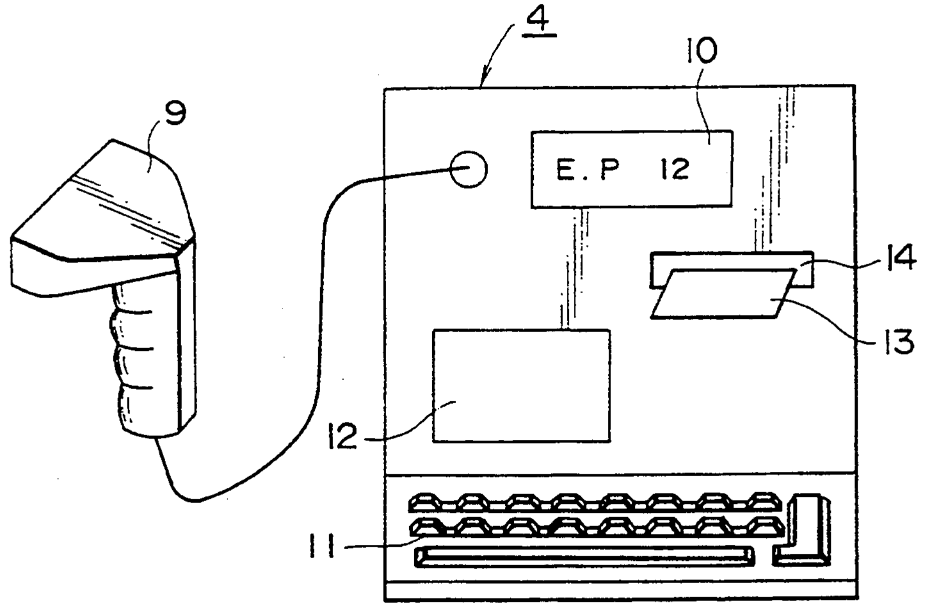
FIG. 3 is a view of an article collecting station of the article retrieval system.

FIG. 3 shows the collection terminal device 4 in detail. The collection terminal device 4 has a display unit 10 for displaying the ecology point which is read from the article 3 by the bar-code reader 9, a keyboard 11 for entering desired ecology points to be compensated and a payment slot 12 for discharging a monetary payment made by the collection terminal device 4.

Figure 4A:
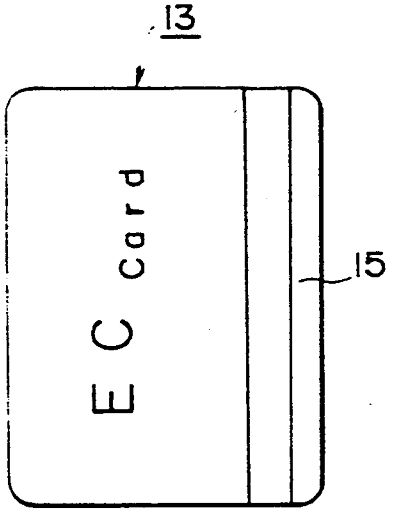
FIGS. 4A and 4B are front and rear views, respectively, of a-recording card for use in the article retrieval system.
Figure 4B:
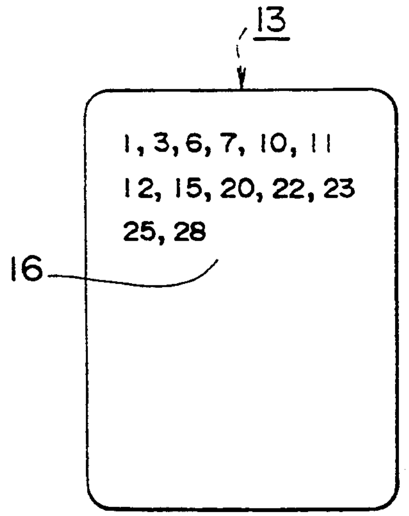

The consumer's recording card 13 is shown in FIGS. 4A and 4B. As shown in FIG. 4A, the consumer's recording card 13 has on its face a magnetic bar 15 for recording necessary information such as ecology points thereon. The information recorded on the magnetic bar 15 also includes the name and number of the consumer's bank account into which a monetary return can be paid. When the consumer's recording card 13 is inserted into the card slot 14, the information recorded on the magnetic bar 15 is read by the card reader 17 (see FIG. 1). As shown in FIG. 4B, the consumer's recording card 13 has on its back a value indication area 16 for indicating ecology points that are read by the bar-code reader 9 and printed or recorded by the card recorder 18.

The collection terminal device 4 is connected to the on-line system of the bank which is associated with the system control station 5, so that a monetary return can be paid into the consumer's bank account through the on-line system based on the account information recorded on the magnetic bar 15 on the consumer's recording card 13.

Figure 5:
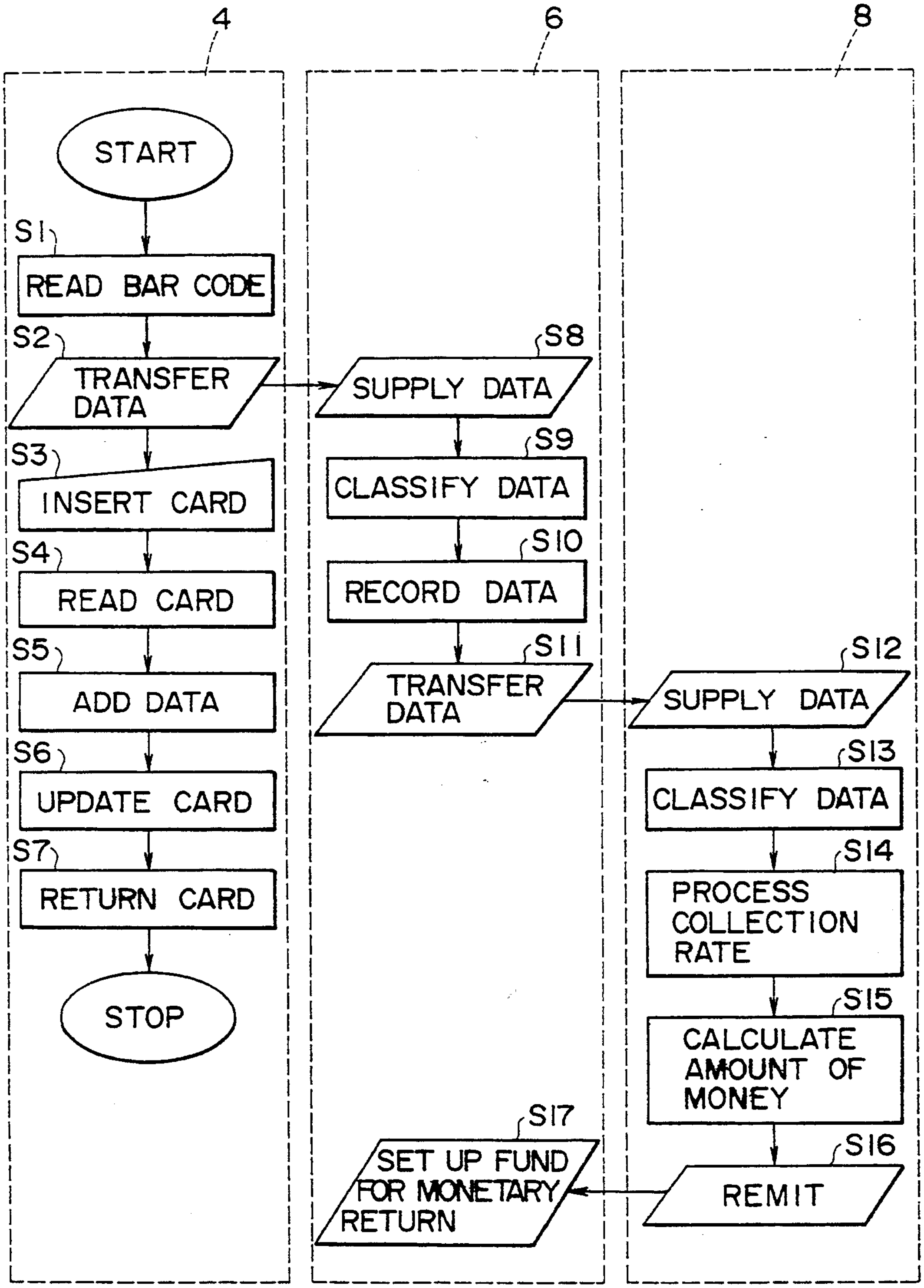
FIG. 5 is a flowchart of an operation sequence of the article retrieval system for collecting an article.

An operation sequence of the article retrieval system for collecting the article 2 will be described below with reference to FIG. 5.

A consumer takes the article 2 and the consumer's recording card 13 to the article collecting station 1, and deposits the article 2 for retrieval. Either the consumer or an attendant to the article collecting station 1 operates on the bar-code reader 9 to read the bar code 3 on the article 2. After the bar code 3 on the article 2 is read by the bar-code reader 9 in a step S1, the data read from the bar code 3 is transferred to the host computer 6 in the system control station 5 in a step S2, and is also used to update the ecology point data on the consumer's recording card 13. More specifically, when the consumer's recording card 13 is inserted into the card slot 14 in a step S3, any ecology point recorded on the magnetic bar 15 of the consumer's recording card 13 is read by the card reader 17 in a step S4, and then the ecology point read from the article 2 by the bar-code reader 9 is added to the existing ecology point by the collection terminal device 4 in a step S5. The existing ecology point recorded on the magnetic bar 15 of the consumer's recording card 13 is then updated by the produced sum of ecology points in a step S6. The updated ecology point is printed in the value indication area 16 of the consumer's recording card 13 by the card recorder 18.

The updated consumer's recording card 13 is returned to the consumer from the card slot 14 in a step S7.

When the data read from the bar code 3 and transferred from the collection terminal device 4 is supplied to the host computer 6 in a step S8, the data is classified for the manufacturer of the article 2 by the host computer 6 in a step S9, and then recorded by the host computer 6 in a step S10. Thereafter, the data is transferred from the host computer 6 to the control terminal device 8 in the manufacturer's station 7 in a step S11. The manufacturer's station 7 belongs to the manufacturer of the article 2. Actually, the article retrieval system has a plurality of manufacturer's stations 7, and the host computer 6 transfers the data to the control terminal device 8 in one of the manufacturer's stations 7 which belongs to the manufacturer of the article 2.

When the data transferred from the host computer 6 is supplied to the control terminal device 8 in a step S12, the data is classified for the article 2 in a step S13. The control terminal device 8 processes the rate of collection of articles based on the classified data in a step S14, and then calculates an amount of money corresponding to the ecology point read from the deposited article 2 in a step S15. The Control terminal device 8 makes a remittance to the host computer 6 in the system control station 5 in a step S16. The system control station 5 uses the remittance as a fund for a monetary return to be given as money in cash, for example, to the consumer in return for the deposited article 2 in a step S17.

In the above procedure, the article 2 is deposited by the consumer and collected by the manufacturer for retrieving any harmful substances contained in the article 2 and/or recycling useful materials contained in the article 2. Then, in exchange for the ecology point recorded on the consumer's recording card 13, a corresponding monetary payment is made in cash, for example, to the consumer or depositor.

Figure 6:
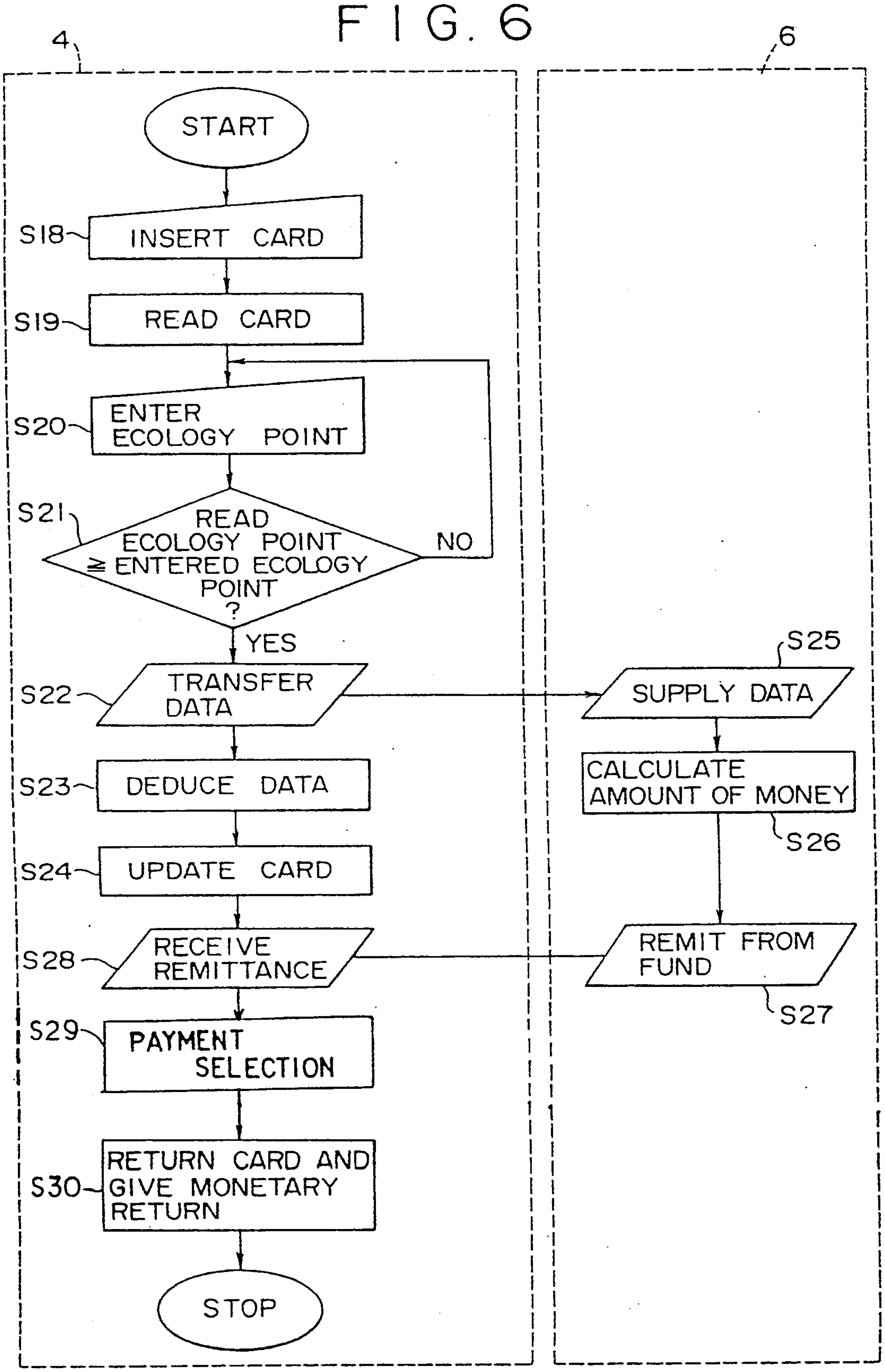
FIG. 6 is a flowchart of an operation sequence of the article retrieval system for a monetary return to an article depositor.

Now, an operation sequence of the article retrieval system for paying a monetary return to the consumer will be described below with reference to FIG. 6.

When the consumer's recording card 13 is inserted through the card slot 14 into the collection terminal device 4 in a step S18, the ecology point recorded on the magnetic bar 15 is read by the card reader 17 in a step S19. Then, the consumer enters a desired ecology point through the keyboard 11 in a step S20. The collection terminal device 4 compares the read ecology point with the entered ecology point in a step S21. If the entered ecology point is equal to or smaller than the read ecology point, then the entered ecology point is transferred as data from the collection terminal device 4 to the host computer 6 in a step S22, If the entered ecology point is greater than the read ecology point, then control loops through the steps S20, S21 until the entered ecology point becomes equal to or smaller than the read ecology point. Then, the entered ecology point is deducted from the ecology point recorded on the consumer's recording card 13 in a step S23. The ecology point data recorded on the magnetic bar 15 is updated according to the remaining ecology point in a step S24. At the same timer the new or remaining ecology point is printed on the value indication area 16 of the consumer's recording card 13 by the card recorder 18.

When the ecology point data transferred from the collection terminal device 4 is supplied to the host computer 6 in a step S25, the host computer 6 calculates an amount of money corresponding to the supplied ecology point data in a step S26, and then makes a remittance representative of the calculated amount of money from the fund as a monetary return to the collection terminal device 4 in a step S27. The collection terminal device 4 receives the remittance in a step S28. In a step S29, the consumer operates on the keyboard 11 to select either a monetary payment in cash through the payment slot 12 or a remittance into the consumer's bank account. At this time, the consumer can enter the bank account number through the keyboard 11 after the consumer has selected a remittance to be paid into the consumer's bank account. The entered bank account information is recorded on the magnetic bar 15 on the consumer's recording card 13. If the bank account information has already been recorded on the magnetic bar 15, then the recorded bank account information is displayed on the display unit 10 after a remittance to be paid into the consumer's band account has been selected. The consumer can then confirm the displayed bank account information through the keyboard 11 for a monetary payment to be actually made. In a next step S30, the collection terminal device 4 returns the consumer's recording card 13 with the updated ecology point data to the consumer, and gives a monetary payment in cash to the consumer through the payment slot 12 or remits a monetary payment to the consumer's bank account depending on the selection made in the step S29.

The information indicative of the ecology point or the convertible value of the article 2, the name of the article 2, and the name of the manufacturer of the article 2 is recorded in the bar code 3 on the article 2, and read by the collection terminal device 4 when the article 2 is deposited. The read information is transferred to the host computer 6 in the system control station 5 to obtain accurate and sufficient data about the deposited article 2. Since the consumer who has deposited the article 2 at the article collecting station 1 receives a monetary payment in cash, for example, in exchange for the deposited article 2, the consumer is given definite benefits in return for the cooperative efforts to retrieve the article 2. Therefore, more and more consumers are encouraged to deposit articles such as disused articles for retrieval of toxic substances and/or recycling of useful materials which may be contained therein. As a result, the rate of collection or articles, i.e., the rate at which articles are collected through the article retrieval system, is increased. The rate of collection of articles may further be increased by assigning higher points to articles.

In the above embodiment, the bar code 3 representing the necessary information is printed on the article 2. However, any of various other information-bearing marks or indicia may be applied to the article 2. Rather than paying money in cash to the consumer in exchange for the ecology point, the article retrieval system may give the consumer something equivalent to money in cash, such as an article of merchandise, a bonus, or the like.

Figure 7:
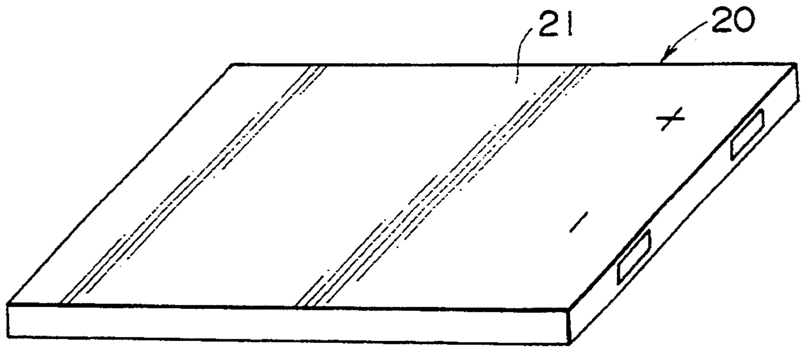
FIG. 7 is a perspective view of a thin lead storage battery as an article that may be collected by the article retrieval system.
Figure 8:
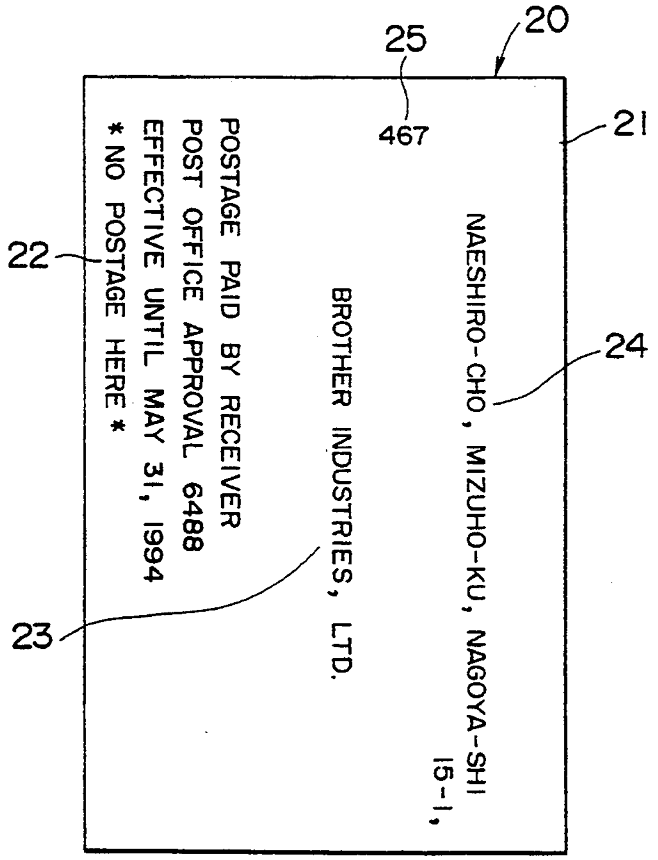
FIG. 8 is a rear view of the thin lead storage battery.
Figure 9:
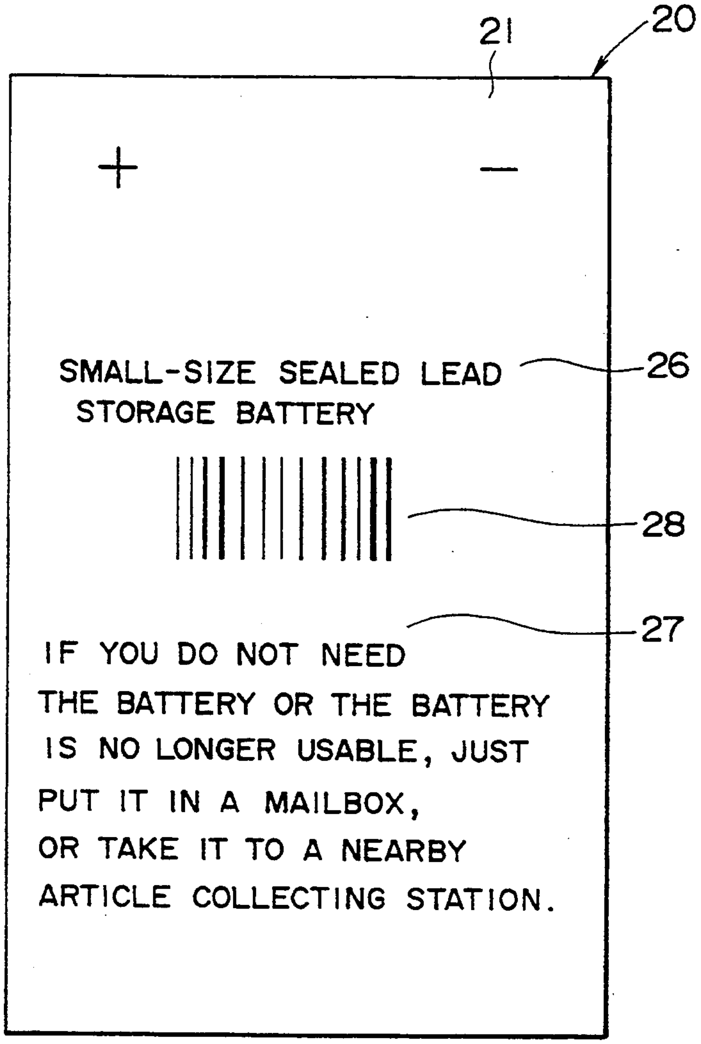
FIG. 9 is a front view of the thin lead storage battery.

FIGS. 7 through 9 show a thin lead storage battery 20 as an article that may be collected through the article retrieval system shown in FIG. 1.

As shown in FIG. 7, the thin lead storage battery 20, which may be of the type disclosed in Japanese laid-open patent publications Nos. 1-132064 and 3-8267, for example, has a package 21 of ABS resin. Typically, the thin lead storage battery 20 has a length of 110 mm, a width of 90 mm, and a thickness of 5 mm, and weighs 80 g.

The thin lead storage battery 20 may be collected through the public postal service or the article retrieval system shown in FIG. 1.

As shown in FIG. 8, the package 21 has on its back various printed pieces of information for mailing the thin lead storage battery 20 back to the manufacturer through the public postal service. The printed pieces of information include a mark 22 indicating with post office approval that the postage will be paid by the receiver, a receiver's name 23, a receiver's address 24, and a receiver's postal code 25.

As shown in FIG. 9, the package 21 has on its face various printed pieces of information including instructions as to how the thin lead storage battery 20 may be returned to the manufacture. The printed pieces of information include an article name 26 and a notice 27. The package 21 also has a bar code 28 printed on its face which represents an ecology point, the article name, and the name of the manufacturer.

If the consumer wants to return the thin lead storage battery 20 to the manufacturer through the public postal service, then the consumer is required to put it in a mailbox. It has been confirmed by various safety tests that no solution leaks from the thin lead storage battery 20 while it is in the mail. In an experiment, 100 thin lead storage batteries 20 were put in various mailboxes in Japan, and all of them were safely delivered to and collected by the manufacturer in a few days.

If the consumer wants to return the thin lead storage battery 20 to the manufacturer through the article retrieval system shown in FIG. 1, then the consumer is required to take it to the article collecting station 1. The consumer will be given an ecology point and get a corresponding monetary payment in return for the deposited thin lead storage battery 20 according to the procedure described above with reference to FIGS. 5 and 6.

What is claimed is:

1. An article retrieval system for collecting an article deposited by a depositor, the article bearing information representative of a convertible value thereof, said article retrieval system comprising:

an article bearing information indicative of the article and its manufacturer, and representative of a convertible value which is determined by the necessity of collecting the article;

reader means for reading the information borne by the article; and control means for preparing a valuable return to the depositor based on the convertible value represented by the information read by said reader means, wherein the valuable return to the depositor and the convertible value vary in accordance with collection data for said article obtained by said control means from said information read by said reader, said control means includes a system control station and a manufacturer's station whereby said manufacturer's station interprets said collection data for articles with respect to said manufacturer and credits said system control station with said valuable return.

2. An article retrieval system for collecting an article deposited by a depositor, said depositor having a card bearing information thereon including information of a designated bank, the article bearing information representative of a convertible value thereof, said article retrieval system comprising:

an article bearing information indicative of the article and its manufacturer, and representative of a convertible value which is determined by the necessity of collecting the article;

reader means for reading the information borne by the article and the depositor card; and control means for preparing a monetary return to the depositor based on the convertible value represented by the information read by said reader means, wherein the monetary return to the depositor and the convertible value vary in accordance with collection data for said article obtained by said control means from said information read by said reader, said control means includes a system control station and a manufacturer's station whereby said manufacturer's station interprets said collection data for articles with respect to said manufacturer and credits said system control station with said monetary return and said monetary return is given to said depositor by direct transfer of funds to said designated bank from said manufacturer to said depositor.

* * * * *